US008004566B2

(12) United States Patent  
Hung et al.

(10) Patent No.: US 8,004,566 B2
(45) Date of Patent: Aug. 23, 2011

(54) SELF CALIBRATION OF WHITE BALANCE FOR A DIGITAL CAMERA DEVICE USING CORRELATED COLOR TEMPERATURE DATA

(75) Inventors: Szepo Robert Hung, San Diego, CA (US); Jingqiang Li, San Diego, CA (US); Ruben M. Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 12/030,814

(22) Filed: Feb. 13, 2008

(65) Prior Publication Data

US 2009/0201374 A1    Aug. 13, 2009

(51) Int. Cl.
*H04N 17/00* (2006.01)
*H04N 17/02* (2006.01)
*H04N 9/73* (2006.01)

(52) U.S. Cl. .................. 348/187; 348/222.1; 348/223.1; 382/167

(58) Field of Classification Search ................. 382/167
See application file for complete search history.

(56) References Cited

U.S. PATENT DOCUMENTS

| | | | |
|---|---|---|---|
| 5,995,142 A | | 11/1999 | Matsufune |
| 6,023,264 A * | | 2/2000 | Gentile et al. ................ 345/596 |
| 6,249,601 B1 * | | 6/2001 | Kim et al. ..................... 382/162 |
| 6,654,493 B1 | | 11/2003 | Hilliard et al. |
| 7,146,041 B2 * | | 12/2006 | Takahashi .................... 382/167 |
| 7,151,563 B2 | | 12/2006 | Higuchi |
| 7,218,344 B2 * | | 5/2007 | Cooper ...................... 348/223.1 |
| 2002/0080245 A1 * | | 6/2002 | Parulski et al. .............. 348/223 |
| 2002/0106206 A1 * | | 8/2002 | Takeshita ..................... 396/429 |
| 2003/0052978 A1 * | | 3/2003 | Kehtarnavaz et al. ..... 348/223.1 |
| 2005/0275912 A1 * | | 12/2005 | Chen et al. ................... 358/523 |
| 2008/0101690 A1 * | | 5/2008 | Hsu et al. ..................... 382/162 |
| 2008/0143844 A1 * | | 6/2008 | Innocent .................... 348/223.1 |

FOREIGN PATENT DOCUMENTS

WO    WO9727708 A1    7/1997

OTHER PUBLICATIONS

International Search Report and the Written Opinion—PCT/US2009/034121, International Search Authority—European Patent Office—Jun. 8, 2009.

* cited by examiner

*Primary Examiner* — Nicholas G Giles
*Assistant Examiner* — Dwight Alex C Tejano
(74) *Attorney, Agent, or Firm* — James Gambale

(57) ABSTRACT

This disclosure describes automatic self-calibration techniques for digital camera devices. In one aspect, a method for performing a calibration procedure in a digital camera device comprises initiating the calibration procedure when a camera sensor of the digital camera device is operating, accumulating data for the calibration procedure, the data comprising one or more averages of correlated color temperature (CCT) associated with information captured by the camera sensor, calculating one or more CCT vectors based on the one or more averages of CCT, and generating gray point correction factors based on the one or more CCT vectors.

60 Claims, 8 Drawing Sheets

SELF CALIBRATION OF WHITE BALANCE FOR A DIGITAL CAMERA DEVICE USING CORRELATED COLOR TEMPERATURE DATA

TECHNICAL FIELD

This disclosure relates to digital camera devices, and more particularly, to techniques for calibration of digital camera devices.

BACKGROUND

Digital cameras are commonly incorporated into a wide variety of devices. In this disclosure, a digital camera device refers to any device that can capture one or more digital images, including devices that can capture still images and devices that can capture sequences of images to record video. By way of example, digital camera devices may comprise stand-alone digital cameras or digital video camcorders, camera-equipped wireless communication device handsets such as mobile telephones, cellular or satellite radio telephones, camera-equipped personal digital assistants (PDAs), computer devices that include cameras such as so-called "webcams," or any devices with digital imaging or video capabilities.

In digital camera devices, calibration is often needed to achieve proper white balance. White balance (sometimes called color balance, gray balance or neutral balance) refers to the adjustment of relative amounts of primary colors (e.g., red, green and blue) in an image or display such that neutral colors are reproduced correctly. White balance may change the overall mixture of colors in an image. Without white balance, the display of captured images may contain undesirable tints.

With many calibration techniques for white balance, knowledge of the camera sensor response is needed so that proper estimates of illuminant conditions can be made. In this case, every camera sensor may need to be measured during the manufacturing process in order to obtain the information that is needed to later perform calibration. The need to measure camera sensor responses of every camera sensor during manufacturing, however, can add significant time and cost to the manufacturing process associated with digital camera devices, which is undesirable.

SUMMARY

This disclosure describes automatic self-calibration techniques for digital camera devices. The described techniques do not require prior knowledge of the camera sensor response of a particular camera sensor, and can operate in a manner that is transparent to the user. When a user operates the digital camera device, automatic self-calibration may be initiated if the proper conditions for self-calibration are identified. This disclosure describes several factors that can be used to initiate self-calibration, and also describe techniques for accumulating data and processing such data to achieve effective calibration.

The described techniques have been simulated to show desirable results for calibration, and may allow digital camera devices to use lower quality camera sensors that have higher amounts of sensor variation between different camera sensors. In this case, the described techniques may compensate for such variations as the digital camera device is used, and eventually achieve proper white balance over time. Only one (or possibly a few) camera sensor(s) may need to be measured during the manufacturing process, and the sensor response(s) of the measured sensor(s) may be used in the calibration procedure for other similarly manufactured camera sensors.

In one aspect, this disclosure provides a method for performing a calibration procedure in a digital camera device. The method comprises initiating the calibration procedure when a camera sensor of the digital camera device is operating, accumulating data for the calibration procedure, the data comprising one or more averages of correlated color temperature (CCT) associated with information captured by the camera sensor, calculating one or more CCT vectors based on the one or more averages of CCT, and generating gray point correction factors based on the one or more CCT vectors.

In another aspect, this disclosure provides an apparatus comprising memory that stores data for a calibration procedure in a digital camera device, and a calibration unit. The calibration unit initiates the calibration procedure when a camera sensor of the digital camera device is operating, accumulates the data for the calibration procedure, the data comprising one or more averages of CCT associated with information captured by the camera sensor, calculates one or more CCT vectors based on the one or more averages of CCT, and generates gray point correction factors based on the one or more CCT vectors.

In another aspect, this disclosure provides a device comprising means for initiating a calibration procedure when a camera sensor of a digital camera device is operating, means for accumulating data for the calibration procedure, the data comprising one or more averages of CCT associated with information captured by the camera sensor, means for calculating one or more CCT vectors based on the one or more averages of CCT, and means for generating gray point correction factors based on the one or more CCT vectors.

In another aspect, this disclosure provides a digital camera device comprising a camera sensor that captures information, a memory that stores data for a calibration procedure based on the captured information, and a calibration unit. The calibration unit initiates the calibration procedure when the camera sensor is operating, accumulates the data for the calibration procedure, the data comprising one or more averages of CCT associated with the information captured by the camera sensor, calculates one or more CCT vectors based on the one or more averages of CCT, and generates gray point correction factors based on the one or more CCT vectors.

These and other techniques described in this disclosure may be implemented in hardware, software, firmware, or any combination thereof. If implemented in software, the software may be executed in a processor, such as a general purpose microprocessor, digital signal processor (DSP), application specific integrated circuit (ASIC), field programmable gate array (FPGA) or other type of processor. Such software may be initially stored in a computer-readable medium and loaded and executed in the processor to facilitate the rotation of an encoded image. The computer readable medium may be sold or distributed as a computer program product, which may include packaging materials.

Accordingly, this disclosure also contemplates a computer-readable medium comprising instructions that upon execution cause a processor to perform a calibration procedure in a digital camera device. In particular, the instructions cause the processor to initiate the calibration procedure when a camera sensor of the digital camera device is operating, accumulate data for the calibration procedure, the data comprising one or more averages of CCT associated with information captured by the camera sensor, calculate one or more CCT vectors based on the one or more averages of CCT, and generate gray point correction factors based on the one or more CCT vectors.

The details of one or more aspects are set forth in the accompanying drawings and the description below. Other features, objects, and advantages will be apparent from the description and drawings, and from the claims.

DETAILED DESCRIPTION

Figure 1:
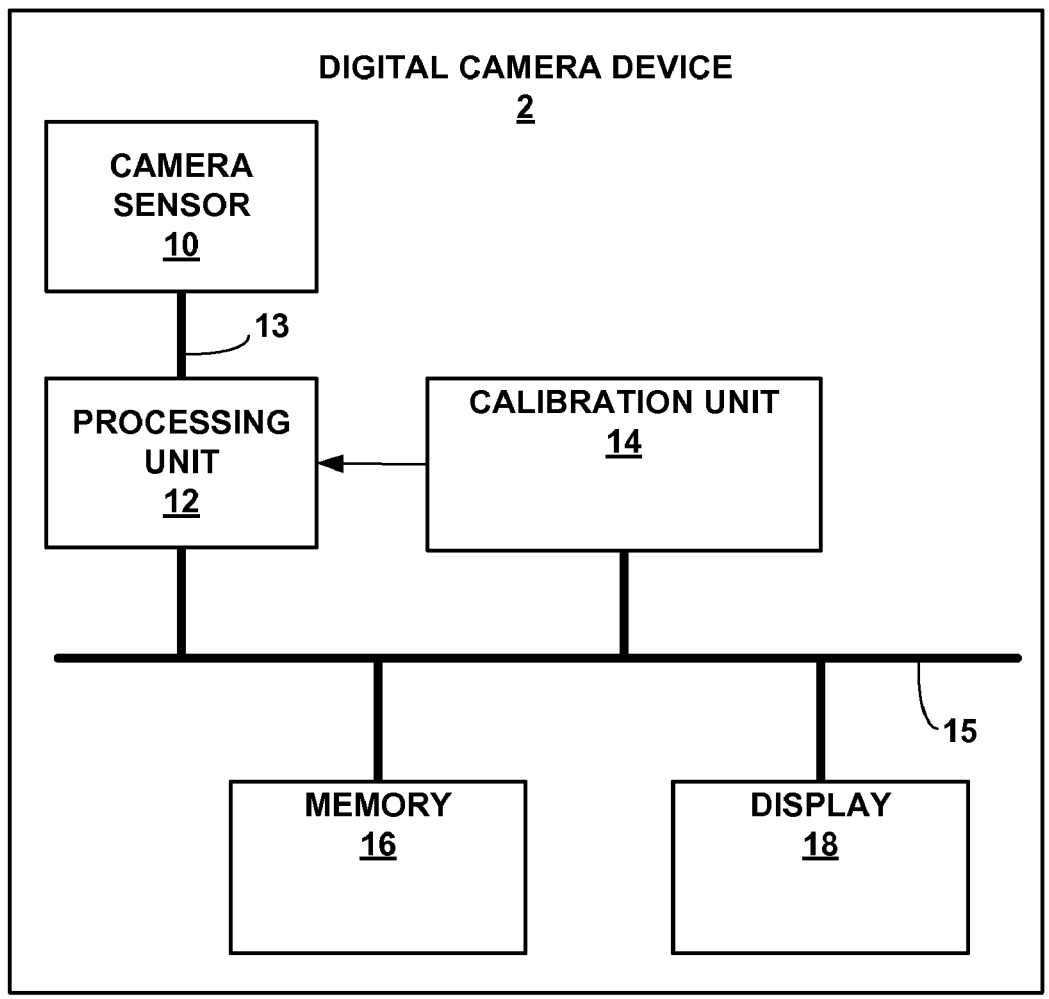
FIG. 1 is a block diagram illustrating an exemplary digital camera device capable of implementing white balance calibration techniques of this disclosure.

This disclosure describes automatic self-calibration techniques for digital camera devices. The described techniques may be executed in a manner that is transparent to a user when the user operates the digital camera device. According to this disclosure, automatic self-calibration may be initiated if proper conditions for self-calibration are identified by a digital camera device, such as conditions associated with outdoor use of the digital camera device in sunny or partially sunny conditions. Once initiated by the digital camera device, the self-calibration technique may accumulate data comprising one or more averages of correlated color temperature (CCT), e.g., an overall average, a high average and a low average.

Next, the automatic self-calibration procedure may calculate one or more CCT vectors relative to an actual light line based on the one or more CCT averages. The actual light line may be based on at least one pre-determined actual color temperature measurement and at least two pre-determined simulated color temperature measurements. The pre-determined actual color temperature measurement(s) and the pre-determined simulated color temperature measurement may be pre-computed and programmed into memory associated with the digital camera device. For example, the pre-determined color temperature measurements may comprise camera sensor response measurements associated with a reference camera sensor that is manufactured similarly to the camera sensor of the digital camera device. The simulated measurements may be done in a lighting chamber under controlled and simulated daylight, and the actual measurement may be done in sunlight at a particular time of day, such as noon, possibly at a defined location on the earth, under clear conditions. Again, however, these measurements may be performed with respect to a reference camera sensor, i.e., a different camera sensor than that being calibrated.

By using camera sensor response measurements associated with a reference camera sensor that is manufactured similarly to the camera sensor of the digital camera device, the described techniques can avoid the need to measure the response of every manufactured camera sensor. Instead, the described techniques may measure the responses of one or more exemplary reference camera sensors of a manufactured lot of camera sensors, and may use the measurements in the white balance calibration of devices that include camera sensors from that manufactured lot.

The CCT vectors can be used to generate gray point correction factors. For example, once the CCT vectors are calculated, the CCT vectors may be used to calculate a combination vector, and gray point correction factors can be generated based on the combination vector. The digital camera device may then apply the gray point correction factors to adjust its gray points. For example, the gray point correction factors may comprise Red/Green (R/G) and Blue/Green (B/G) components of a combination vector defined in an R/G by B/G color space.

The described techniques may be performed in an iterative fashion, with each of the iterations being defined during a subsequent use of the digital camera device. In this way, the gray point correction factors may converge to a desirable level after several iterations of the self-calibration technique. Furthermore, the techniques may cause the device to improve its calibration with use. In particular, the more the digital camera device is used, the better its calibration may be. As noted, the described techniques do not require prior knowledge of the camera sensor response associated with each digital camera device, which may eliminate the need to perform sensor response measurements when the digital camera devices are manufactured. The described techniques have been simulated to show desirable results for calibration, and may allow digital camera devices to use lower quality camera sensors that have higher amounts of sensor variation between different camera sensors. In this case, the described techniques may allow for cost reductions in digital camera devices by facilitating use of lower cost camera sensors. The described techniques may compensate for camera sensor variations as the digital camera device is used, and eventually achieve proper white balance over time.

FIG. 1 is a block diagram illustrating an exemplary digital camera device 2 that implements techniques of this disclosure. By way of example, digital camera device 2 may comprise a stand-alone digital camera, a digital video camcorder, a camera-equipped wireless communication device handset, such a cellular or satellite radio telephone, a camera-equipped personal digital assistant (PDA), a computer device equipped with a digital camera, web-cam or the like, or any other device with imaging or video capabilities. The techniques of this disclosure may be particularly applicable to devices where it is desirable to limit costs associated with camera sensors, such as in camera-equipped wireless communication device handsets. In this case, the described techniques may allow such digital camera devices to use lower quality camera sensors that have higher amounts of sensor variation between different camera sensors, and may eliminate the need to measure the response of every camera sensor when the devices are manufactured.

In the example of FIG. 1, device 2 comprises a camera sensor 10 that captures information. The captured information may comprise output of camera sensor 10 that could be used to define one or more still image photographs, or image frames of a video sequence. The described calibration technique, however, may operate during a viewfinder mode in which the captured information is not presented as recorded images or recorded video. The captured information may be used in the calibration procedure without the knowledge of the user. The described techniques may occur every time camera sensor 10 is operating, e.g., any time information is being captured by camera sensor 10.

The captured information may be sent from camera sensor 10 to processing unit 12 via a dedicated bus 13. Processing unit 12 may be referred to as an imaging "front end," and may comprise a unit or possibly a pipeline of units that perform various image processing functions. The functions performed by processing unit 12 may include scaling, white balance, cropping, demosaicing, signal noise reduction, sharpening or any other front end image data processing. Following the calibration procedure discussed herein, calibration unit 14 may provide gray point correction factors to processing unit 12 so that processing unit 12 can apply the gray point correction factors to adjust gray points used by digital camera device 2 to control white balance.

Camera sensor 10 may include a two-dimensional array of individual pixel sensor elements, e.g., arranged in rows and columns. In some aspects, each of the elements of camera sensor 10 may be associated with a single pixel. Alternatively, there may be more than one pixel element associated with each pixel, e.g., each pixel may be defined by a set of red (R), green (G) and blue (B) pixel elements of camera sensor 10. Camera sensor 10 may comprise, for example, an array of solid state elements such as complementary metal-oxide semiconductor (CMOS) elements, charge coupled device (CCD) elements, or any other elements used to form a camera sensor in digital camera applications. Although not shown in FIG. 1, digital camera device 2 may include other optical components, such as one or more lenses, lens actuators for focal adjustment, shutters, a flash device to illuminate an image scene, and other components, if desired. The architecture illustrated in FIG. 1 is merely exemplary, as the techniques described in this disclosure may be implemented with a variety of other architectures.

Camera sensor 10 exposes its elements to the image scene, e.g., upon activation of a camera mode in digital camera device 2 by a user. Upon activation of camera mode, camera sensor 10 may, for example, capture intensity values representing the intensity of the captured light at each particular pixel position. In some cases, each of the elements of camera sensor 10 may only be sensitive to one color or one color band, due to color filters covering the sensors. For example, camera sensor 10 may comprise an array of elements with appropriate filters so as to define R, G and B channels. However, camera sensor 10 may utilize other types of color filters. Each of the elements of camera sensor 10 may capture intensity values for only one color. The captured information may include pixel intensity and/or color values captured by the elements of camera sensor 10. A given pixel may be defined by a set of R, G and B values.

Processor unit 12 receives raw data (i.e., captured information) from camera 10, and may perform any of a wide variety of image processing techniques on such raw data. As mentioned above, processing unit 12 may comprise a processing pipeline, or possibly several different units that perform different processing functions. The captured and processed image data is stored in memory 16, and possibly displayed to a user via display 18.

Calibration unit 14 executes the calibration techniques of this disclosure in order to adjust gray point correction factors to gray points processing unit 12 compares to the captured image data during white balance. In accordance with this disclosure, calibration unit 14 executes the calibration techniques when camera sensor 10 is operating. In other words, when a user activates camera sensor 10, the calibration procedure occurs. Following the calibration procedure, calibration unit 14 may send the calculated gray point correction factors to processing unit 12 for application to adjust gray points of digital camera device 2. Display 18, memory 16, calibration unit 14 and processing unit 12 may be communicatively coupled to one another via a shared data communication bus 15. Processing unit 12 may then perform white balance to incoming captured information based on the adjusted gray points.

Memory 16 may comprise any form of volatile or non-volatile memory, such as read-only memory (ROM), a form of random access memory (RAM), electrically erasable programmable read-only memory (EEPROM), FLASH memory, or some type of data storage drive or unit. Typically, memory 16 may be implemented as some type of RAM or FLASH memory to ensure fast data transfer between the different components of device 2.

Display 18 may comprise a viewfinder for digital camera device 2, e.g., in order to provide the user with up-to-date images associated with the scene that is being captured by camera sensor 10. Captured images or video may also be presented on display 18 for viewing by a user. However, the techniques of this disclosure may take place in a manner that is transparent to the user of device 2, i.e., the user may be unaware that the calibration process is occurring anytime that camera sensor 10 is operating.

Depending on the implementation, device 2 may also include many other components. For example, device 2 may include one or more image encoders, such as Joint Photographic Experts Group (JPEG) encoders to compress images, or one or more video encoder, such as Motion Pictures Expert Group (MPEG) encoders or International Telecommunication Union (ITU) H.263 or H.264 encoders to compress video. Also, if device 2 is implemented as a wireless communication device handset, device 2 may include various components for wireless communication, such as a wireless transmitter, wireless receiver, a modulator-demodulator (MODEM), and one or more antennas. These or other components may be included in device 2, depending upon implementation. These other components are not shown in FIG. 1 for simplicity and ease of illustration of the calibration techniques described herein.

Calibration unit 14 may be implemented as hardware, software, firmware, or any of a wide variety of combinations of hardware, software or firmware. Calibration unit 14 may be realized by one or more microprocessors, digital signal processors (DSPs), application specific integrated circuits (ASICs), field programmable gate arrays (FPGAs), or any other equivalent discrete or integrated logic circuitry, or a combination thereof. If implemented in software, instructions executed as part of the calibration process may be stored on a computer-readable medium and executed in one or more processors to realize calibration unit 14 and cause device 2 to perform the techniques described herein.

Figure 2:
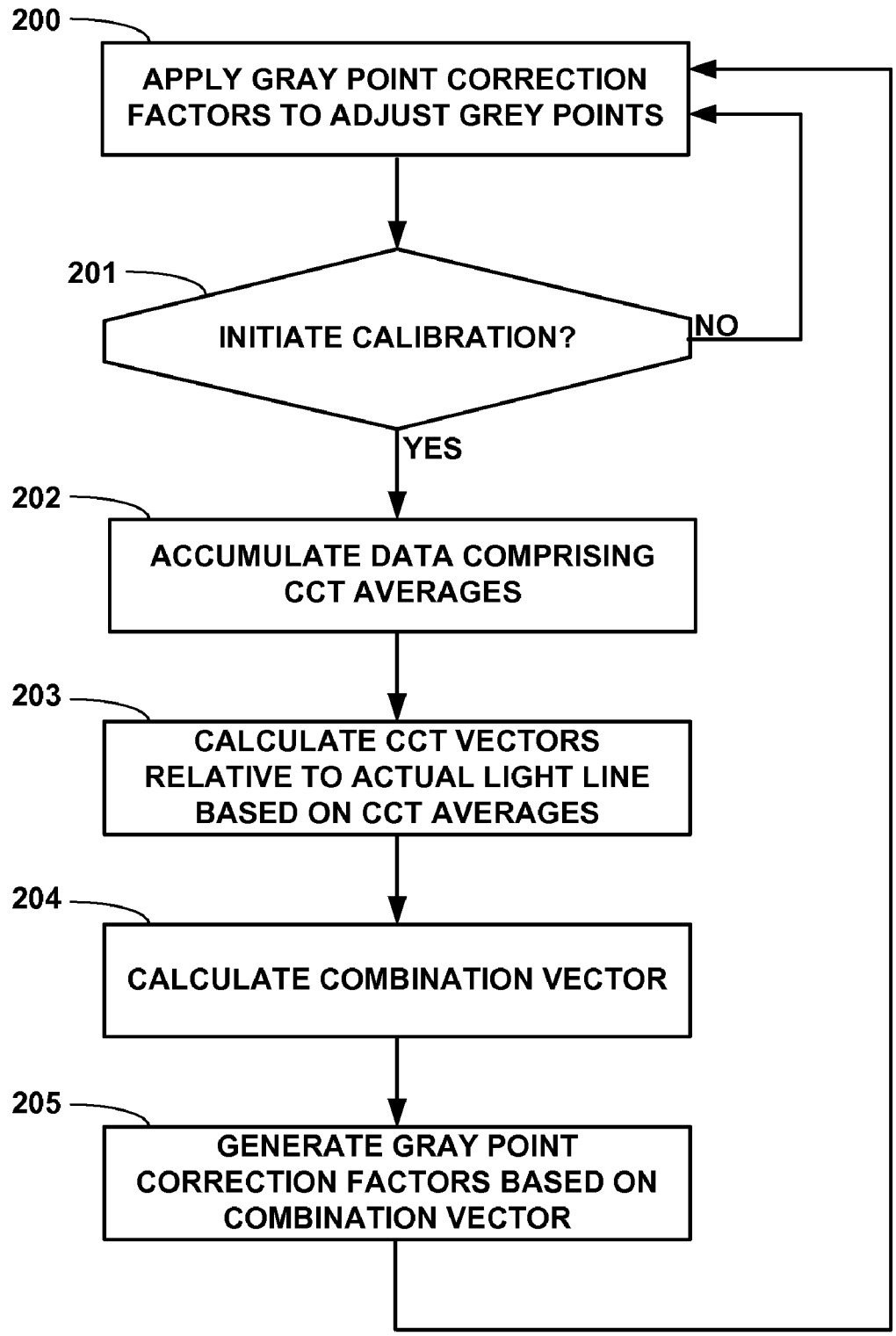
FIG. 2 is a flow diagram illustrating an exemplary white balance calibration technique consistent with this disclosure that may be implemented by a digital camera device.

FIG. 2 is a flow diagram illustrating an exemplary technique consistent with this disclosure that may be implemented by digital camera device 2. As shown in FIG. 2, processing unit 12 may apply gray point correction factors to adjust gray points in device 2 (200). Initially, the gray point correction factors may be set to values of unity or 1, such that adjustments do not occur. The calibration process of this disclosure may include steps 201-205 of FIG. 2, which generate new correction factors. With each iteration of the technique shown in FIG. 2, the correction factors may be re-generated so as to converge towards desirable white balance. If calibration is not initiated (no branch of 201), processing unit 12 continues to apply gray point correction factors generated in the previous iteration of the calibration process.

The gray point correction factors are applied to adjust the gray points in device 2 (200). The adjusted gray points, then, are used for white balance. In one example of white balance, captured R, G and B values associated with pixels of captured information may be compared to the gray points. If pixels define R, G and B values that do not substantially or sufficiently correspond to the gray points, such pixels may be discarded as poor data. In this way, processing unit 12 may perform white balance to accept or reject pixels based on whether the pixels substantially or sufficiently correspond to the gray points. A wide variety of white balance algorithms, however, can benefit from the teaching of this disclosure, which is used to calibrate the gray points. Properly calibrated gray points can improve a wide variety of imaging techniques that rely on white balance to accept or eliminate data that is not sufficiently balanced near the gray points.

For example, so-called "gray world" white balance algorithms may involve searches for "near gray" pixels. In this case, properly calibrated gray points are important in order to define where these searches for "near gray" pixels should occur. Also, for so-called color by correction white balance algorithms, properly calibrated gray points are important to facilitate the creation of a color correction map. Furthermore, other types of white balance algorithms may rely on gray points to predict the boundaries of a color gamut. In this case, properly calibrated gray points are important to facilitate proper color gamut boundary prediction. In so-called neural-network type of white balance algorithms, gray points are used to set up weighting functions between synapses. In this case, properly calibrated gray points are important to facilitate the set up of weighting functions. These and many other white balance algorithms may benefit from the teaching of this disclosure.

In the calibration process, calibration unit 14 first determines whether to initiate calibration (201). When calibration is initiated (yes branch of 201), calibration unit 14 accumulates data into memory 16 (202). For the calibration procedure, this accumulated data may comprise one or more averages of correlated color temperature (CCT). CCT is a well known parameter in color science, and is the color temperature of a black body radiator that most closely matches the light associated with captured pixel values, as perceived by the human eye. CCT may be given in absolute units, e.g., units of Kelvin (K). CCT averages refer to one or more averages of CCT of scenes captured by camera sensor 10 over a period of time.

After accumulating the one or more averages of CCT, calibration unit 14 may calculate CCT vectors relative to an actual light line (203). The CCT vectors may be calculated based on the CCT averages. As discussed in greater detail below, an actual light line may be pre-calculated and stored in memory 16 for use by calibration unit 14. The actual light line may represent a linear interpolation of a simulated light line, and may be constructed based on at least two simulated light measurements and at least one actual light measurement associated with a reference camera sensor. The reference camera sensor used to create the actual light line may be similar to camera sensor 10 of digital camera device. In particular, the reference camera sensor may have an identical or similar construction to that of camera sensor 10. For example, the reference camera sensor may be a camera sensor from the same manufacturing lot as camera sensor 10, or a camera sensor generally associated with the same manufacturer and/ or product number as camera sensor 10. In this way, the actual light line associated with a different, but similarly constructed reference camera sensor may be used to aid in calibration of data from camera sensor 10 in device 2. Additional details on the simulated light line and actual light line are provided below.

Next, calibration unit 14 calculates a combination vector (204). The combination vector may comprise a weighted sum of the CCT vectors, and the weightings may be selected based on reliability and probable accuracy of the CCT vectors. For example, as discussed in greater detail below, the averages of CCT may comprise an overall average CCT, a high average CCT and a low average CCT. In this case, the overall average CCT comprises an average of all CCT samples collected by camera sensor 10, the high average CCT comprises an average of the CCT samples that are greater than the overall average CCT, and the low average CCT comprises an average of the CCT samples that are less than the overall average CCT. The combination vector may comprise a weighted sum of an overall CCT vector, a high CCT vector and a low CCT vector, where respective weights are applied to the individual overall, high and low CCT vectors. Moreover, in some cases if either the high CCT vector or low CCT vector comprise bad data, the weightings may be assigned so that the combination vector corresponds to the overall CCT vector. Additional details on these concepts of CCT averages and CCT vectors are provided below.

Next, calibration unit 14 may generate gray point correction factors based on the combination vector (205). For example, as discussed in greater detail below, a combination vector (V) in a R/B by B/G color space, may be divided into a Vx component in an R/G direction and a Vy component in a B/G direction. The gray point correction factors may be generated as:

Fx=Vx/(a simulated R/G value corresponding to approximately 5000 Kelvin)

Fy=Vy/(a simulated B/G value corresponding to approximately 5000 Kelvin).

Once the correction factors are generated, processing unit 12 applies the gray point correction factors to adjust gray points (200). Again, with each iteration of the technique shown in FIG. 2, the correction factors may be re-generated so as to converge towards desirable white balance.

By adjusting the gray points, white balance can be improved. In one example, white balance is a process of using the gray points to determine whether to accept or reject pixels of an image scene. In this case, captured R, G and B values associated with pixels of captured information may be compared to the gray points. If pixels define R, G and B values that do not substantially or sufficiently correspond to the gray points, such pixels may be discarded as poor data. In this way, white balance can accept or reject pixels based on whether the pixels substantially or sufficiently correspond to the gray points. A wide variety of white balance algorithms can benefit from the teaching of this disclosure, which is used to calibrate the gray points. Properly calibrated gray points can improve a wide variety of imaging techniques that rely on white balance to accept or eliminate data that is not sufficiently balanced.

In another example, so-called "gray world" white balance algorithms may involve searches for "near gray" pixels. In this case, properly calibrated gray points are important in order to define where these searches for "near gray" pixels should occur. Also, for so-called color by correlation white balance algorithms, properly calibrated gray points are important to facilitate the creation of a color correlation map. Furthermore, other types of white balance algorithms may rely on gray points to predict the boundaries of a color gamut.

In this case, properly calibrated gray points are important to facilitate proper color gamut boundary prediction. In so-called neural-network type of white balance algorithms, gray points are used to set up weighting functions between synapses. In this case, properly calibrated gray points are important to facilitate the set up of weighting functions. These and many other white balance algorithms may benefit from the teaching of this disclosure.

The decision whether to initiate calibration (201) may be based on several factors. Generally, calibration unit 14 may be designed to initiate or trigger calibration when the procedure has a high probability of capturing useful data for the calibration. In order for calibration unit 14 to define a standard for the captured data, calibration unit 14 may be designed to automatically recognize or determine when camera sensor 10 is capturing outdoor light, preferably in sunny conditions. For example, calibration unit 14 may compare measured brightness to a threshold, wherein the threshold defines a level of brightness associated with outdoor sunny (or cloudy) conditions. For example, the threshold may be 10,000 lux, or another level of brightness associated with outdoor sunny (or cloudy) conditions. The level of brightness associated with the image scene may be quantified based on R, G, B gains applied by image processing unit 12 and exposure times associated with image sensor 10. In this case, small gains and small exposure time may be due to high levels of brightness. Device 2 may be configured to quantify the brightness based on these or other measurable factors. Alternatively or additionally, calibration unit 14 may utilize object recognition techniques in order to identify outdoor use of digital camera device 2, such as the recognition of trees or other objects by camera sensor 10 that may be associated with outdoor use.

As one example, calibration unit 14 may initiate the calibration procedure (yes branch of 201) when measured brightness is greater than a brightness threshold. In addition, if camera sensor 10 includes or is associated with an automatic exposure control (AEC) unit, calibration unit 14 may require AEC defined by the AEC unit of camera sensor 10 to be steady. AEC may be steady, for example, when variation of exposure over time is within a defined threshold for exposure. In this case, calibration unit 14 may initiate the calibration procedure (yes branch of 201) when measured brightness is greater than a brightness threshold and the AEC is determined to be steady. In addition, calibration unit 14 may also perform an outdoor determination based on lighting conditions and gains of R, G and B channels, which may be selected and/or applied by processing unit 12. In this case, calibration unit 14 may initiate the calibration procedure (yes branch of 201) when measured brightness is greater than a brightness threshold, the AEC is determined to be steady, and a high confidence outdoor determination is made by calibration unit 14, wherein the high confidence outdoor determination is based on lighting conditions and gains of R, G and B channels applied by processing unit 12 to the information captured by the camera sensor. The high confidence outdoor determination may help to eliminate calibration initiation where a camera sensor 10 detects brightness above the threshold due to the camera sensor being pointed directly at an indoor light source.

Figure 3:
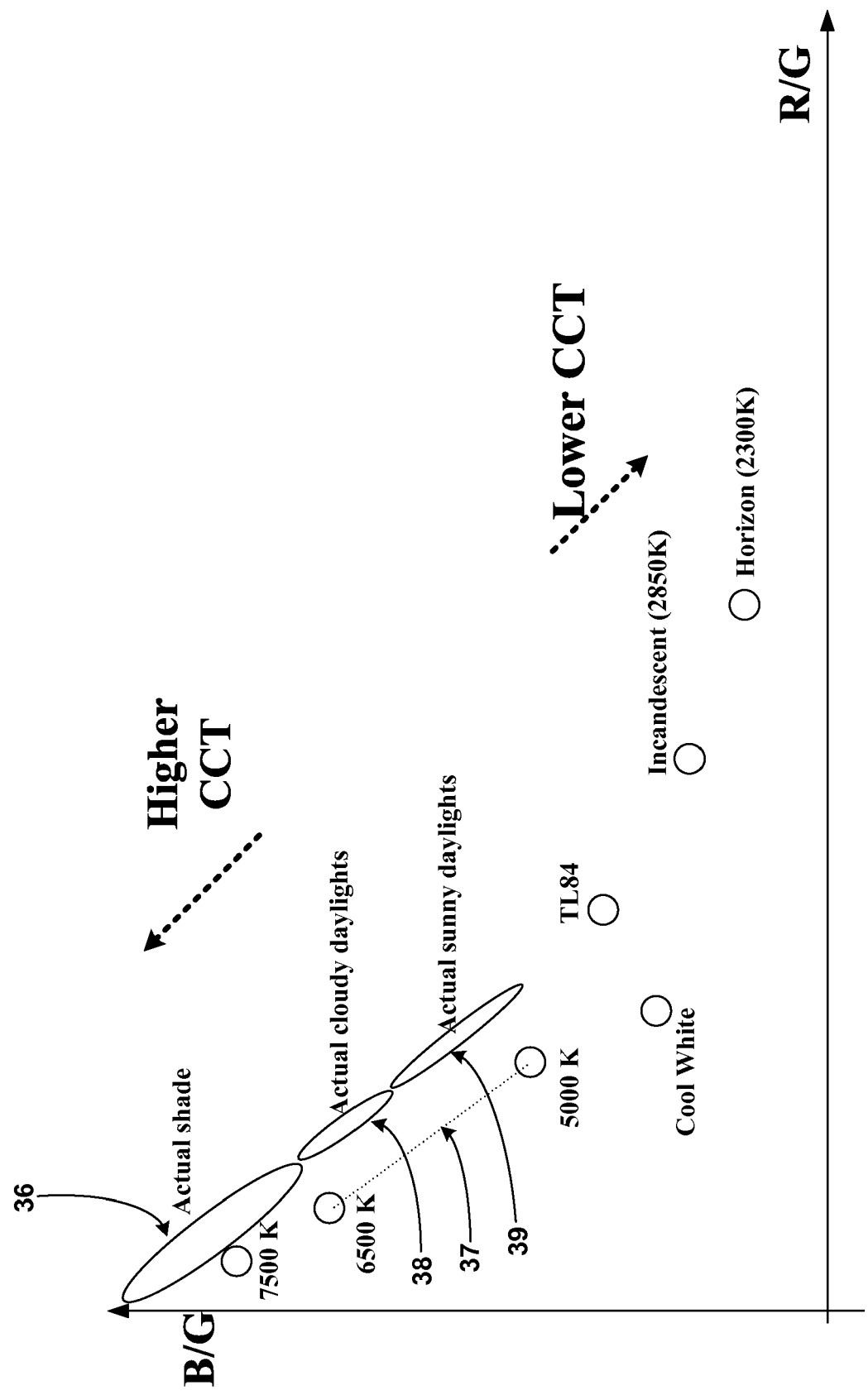
FIG. 3 is a graph illustrating exemplary gray points of camera sensors in an (R/G, B/G) color space.

FIG. 3 is a graph illustrating exemplary gray points of camera sensors in an (R/G, B/G) color space. The x-axis of the graph in FIG. 3 is the R/G value for a pixel having R, G and B values. The y-axis of the graph in FIG. 3 is the B/G value for a pixel. R/G and B/G values are given in units of color temperature, i.e., degrees of Kelvin (K). As graphically illustrated in FIG. 3, this disclosure recognizes that for most camera sensors, the distribution of the true gray points under actual daylight has a distribution that is generally parallel to a line defined between simulated 6500 K and simulated 5000 K color temperatures. The simulated color temperature points refer to gray points as defined under simulated light, e.g., in a lighting chamber. Unfortunately, simulated lighting chambers do not accurately duplicate actual outdoor light, but merely approximate outdoor light. The techniques of this disclosure use outdoor determinations in order to ensure that captured data likely corresponds to data in areas 38 and 39, which correspond to an actual cloudy daylight condition and an actual sunny daylight condition, respectively. This allows for gray point adjustments to utilize the linear nature of gray points in these areas and to utilize simulated gray points along line 37 to formulate such adjustments.

Based on the data shown in FIG. 3, actual cloudy or actual sunny conditions associated with gray points of areas 38 and 39 may be the best lighting conditions for self-calibration. The various indoor lightings may be poorly suited for effective self calibration consistent with this disclosure. Moreover, shady conditions, e.g., associated with gray points in area 36 has a much larger distribution area, and may be more affected by other objects outside the field of view of the camera sensor. For these reasons, the self-calibration techniques of this disclosure attempt to control data capturing to scenarios where the data likely falls in areas 38 or 39 of FIG. 3.

Referring again to FIG. 2, when calibration is initiated (yes branch of 201), calibration unit 14 accumulates data into memory 16 (202). Again, this accumulated data comprises one or more averages of correlated color temperature (CCT) of image scenes captured by camera sensor 10. The averages may comprise an overall average CCT, a high average CCT and a low average CCT. The overall average CCT comprises an average of CCT samples collected by the camera sensor 10, the high average CCT comprises an average of the CCT samples greater than the overall average CCT collected by the camera sensor 10, and the low average CCT comprises an average of the CCT samples less than the overall average CCT collected by the camera sensor 10. The number of samples counted in the averages may also be tracked.

For example, memory 16 may store a data structure defined as "Self_Cal". The Self_Cal data structure may contain:
  Average (R/G, B/G) values & count
  Low CCT average (R/G, B/G) values & count
  High CCT average (R/G, B/G) values & count
  Previous R/G gain, Previous B/G gain
This may only require the Self_Cal data structure to maintain 11 numbers (8 floating points for the averages and gains, and 3 integers for the counts). As an example, the Self_Cal data structure may contain the following 11 numbers:
  Overal_Ave_rg, which represents the overall average of CCT points for R/G,
  Overall_Ave_bg, which represents the overall average of CCT points for B/G,
  Overall_Ave_cnt, which represents the overall count associated with the overall averages of CCT points for R/G and B/G,
  Low_cct_rg_ave, which represents the low average of CCT points for R/G,
  Low_cct_bg_ave, which represents the low average of CCT points for B/G,
  Low_cct_cnt, which represents the low count associated with the low averages of CCT points for R/G and B/G,
  High_cct_rg_ave, which represents the high average of CCT points for R/G,
  High_cct_bg_ave, which represents the high average of CCT points for B/G,
  High_cct_cnt, which represents the high count associated with the low averages of CCT points for R/G and B/G, Previous_rg_gain, which represents the previous correction factor (Fx) used to correct the R/G gray point, and
Previous_bg_gain, which represents the previous correction factor (Fy) used to correct the B/G gray point.

When a new (R/G, B/G) value is added to the Self_Cal data structure, calibration unit 14 may perform the following computations:

Recompute Overal_Ave_rg and Overall_Ave_bg
    Increment Overall_Ave_cnt
    If for a new (R/G, B/G) value, B/G is less than or equal to Low_cct_bg_ave
        Recompute Low_cct_rg_ave and Low_cct_bg_ave
        Increment Low_cct_cnt
    If for a new (R/G, B/G) value, B/G is greater than High_cct_bg_ave
        Recompute High_cct_rg_ave and High_cct_bg_ave
        Increment High_cct_cnt Calibration unit 14 may define a maximum value for the counts such that if a given one of the counts reaches the predefined maximum value, updating of the averages does not take place to avoid numerical overflow. Count numbers could be re-set to lower numbers (following accumulation) if additional data is desired above the maximum number of counts.

Prior to calibration, i.e., initially, the self-cal data structure may be initialized as follows:

Low_cct_rg_ave=0.0, Low_cct_bg_ave=0.0, Low_cct_cnt=0
    High_cct_rg_ave=0.0, High_cct_bg_ave=0.0, High_cct_cnt=0
    Overal_Ave_rg=0.0, Overall_ave_bg=0.0, Overall_ave_cnt=0
    Previous_rg_gain=1.0, Previous_bg_gain=1.0

These values may be stored in a non-volatile memory, e.g., memory 16 or another memory location.

Figures 4A, 4B, 4C:
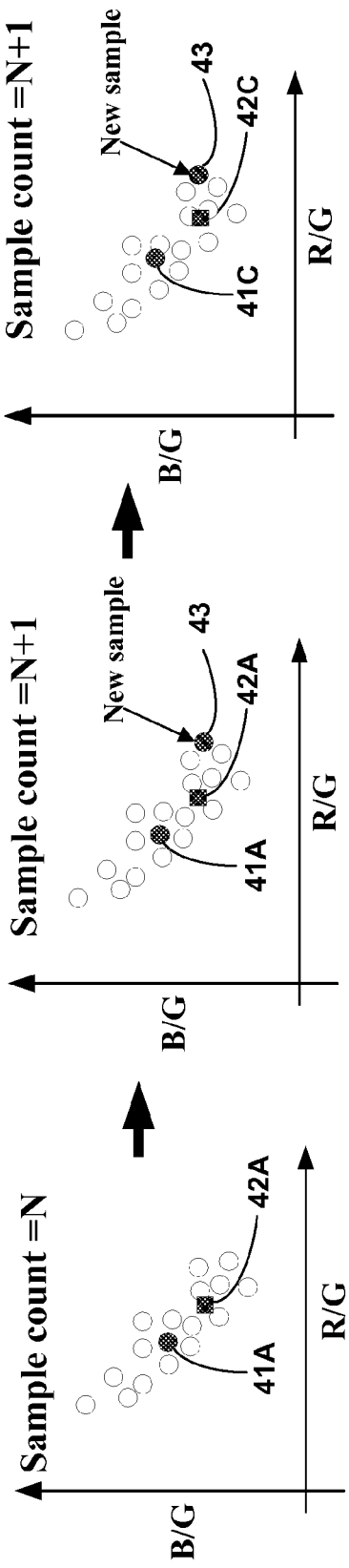
FIGS. 4A-4C are graphs that illustrate a process of accumulating data for the calibration procedure.

FIGS. 4A-4C are graphs that illustrate the process of accumulating data for the calibration procedure. The graphs of FIGS. 4A-4C illustrate samples that comprise color temperature measurements associated with captured image scenes. These samples can be accumulated by calibration unit 14 to define one or more CCT averages, such as an overall CCT average, a high CCT average and a low CCT average.

The high average CCT is not shown in FIGS. 4A-4C, but is accumulated in a manner similar to the low average CCT. Before self calibration begins, the overall average is the same as the low CCT average. FIG. 4A shows an exemplary overall average 41A and low CCT average 42A at sample count N, meaning that N samples have been obtained to define the overall average during the calibration procedure. When a new sample 43 arrives, as shown in FIG. 4B, overall average 41A and low CCT average 42A change to overall average 41C and low CCT average 42C shown in FIG. 4C. This procedure iteratively pushes the low CCT average 42C away from overall average 41C downwards and rightwards. In a similar manner, the procedure also iteratively pushes the high CCT average (not shown in FIGS. 4A-4C) away from overall average upwards and leftwards.

Referring again to FIG. 2, after accumulating the one or more averages of CCT (e.g., the overall average CCT, the high average CCT and the low average CCT), calibration unit 14 calculates CCT vectors relative to an actual light line (203). The actual light line may be pre-calculated and stored in memory 16 for use by calibration unit 14. The actual light line may represent a linear interpolation of a simulated light line, and may be constructed based on at least two simulated light measurements and at least one actual light measurement associated with a different camera sensor. The different camera sensor used to create the actual light line may be similar to camera sensor 10 of digital camera device, e.g., a camera sensor from the same manufacturing lot as camera sensor 10, or a camera sensor generally associated with the same manufacturer and/or product number as camera sensor 10. In this way, the actual light line associated with a similar camera sensor may be used to aid in calibration of data from camera sensor 10 in device 2.

Figure 5:
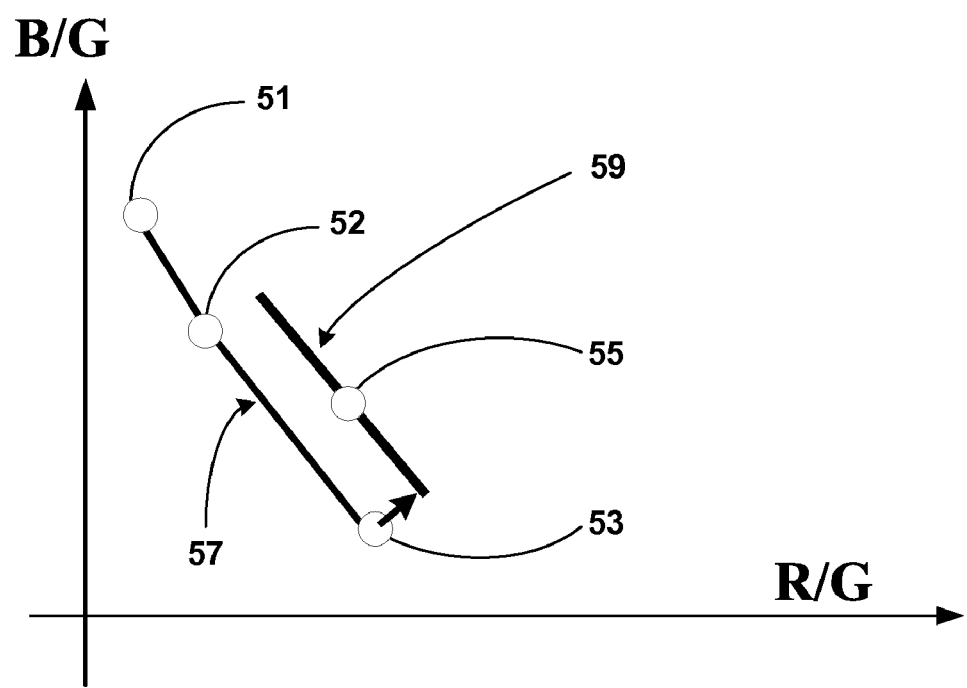
FIG. 5 is a graph illustrating construction of an actual light line based on two simulated light measurement points and one actual light measurement point.

FIG. 5 is a graph illustrating the construction of an actual light line 59 based on two simulated light measurement points 52 and 53 and one actual light measurement point 55. In FIG. 5, point 51 may comprise a simulated light measurement at 7500 K, point 52 may comprise a simulated light measurement at 6500 K, and point 53 may comprise a simulated light measurement at 5000 K. Simulated light measurements 51, 52 and 53 may be performed with respect to a reference camera sensor in a light chamber, wherein the light chamber simulates light at 5000 K and 6500 K. The reference camera sensor may comprise a different sensor having a construction similar to camera sensor 10 (FIG. 1) to be calibrated. For example, the reference camera sensor used to construct actual light line 59 for a sensor 10 to be calibrated may be an exemplary sensor associated with a given lot of manufactured sensors. Devices that use the other sensors such as camera sensor 10, then, can use the actual light line 59 of this exemplary reference camera sensor as data in their respective calibration processes.

Actual light measurement point 55 corresponds to an actual outdoor light measurement by the reference camera sensor in lighting between 5000 K and 6500 K, e.g., in sunny or cloudy conditions. Thus, actual light line 59 may comprise an actual daylight line, e.g., a line corresponding to the gray points of the reference sensor in actual daylight. Actual light measurement point 55 may be defined by an outdoor measurement in sunny or party cloudy conditions. The geographic location associated with actual light measurement point 55 may be selected or defined in order to achieve measurement of desired actual light, e.g., a particular latitude and longitude on the face of the earth at a defined date of the year.

Based on two or more simulated light measurements (e.g., corresponding to points 52 and 53), simulated light line 57 is defined. Simulated light line 57 may comprise a line that corresponds to the gray points of the reference camera sensor in simulated daylight. Simulated light line 57 can be linearly interpolated to actual light measurement point 55 to thereby define actual light line 59. In this way, actual light line 59 is approximately parallel to simulated light line 57 defined by the at least two pre-determined simulated color temperature measurements (points 52 and 53), wherein actual color temperature measurement point 59 and simulated color temperature points 52 and 53 are pre-determined (prior to the calibration procedure) based on measurements of a different reference camera sensor that is manufactured similarly to camera sensor 10 (FIG. 1) of digital camera device 2 being calibrated. In this way, actual light line 59 may comprise a calculation of the expected gray points of camera sensor 10, which is determined based on a similar reference camera sensor to camera sensor 10. The described calibration procedure may use this actual light line 59 as a starting point for calibration of camera sensor 10. That is, the calibration process may assume that camera sensor 10 has a response associated with actual light line 10, and the calibration process described herein may adjust actual gray points relative to those defined on actual light line 10.

Figure 6:
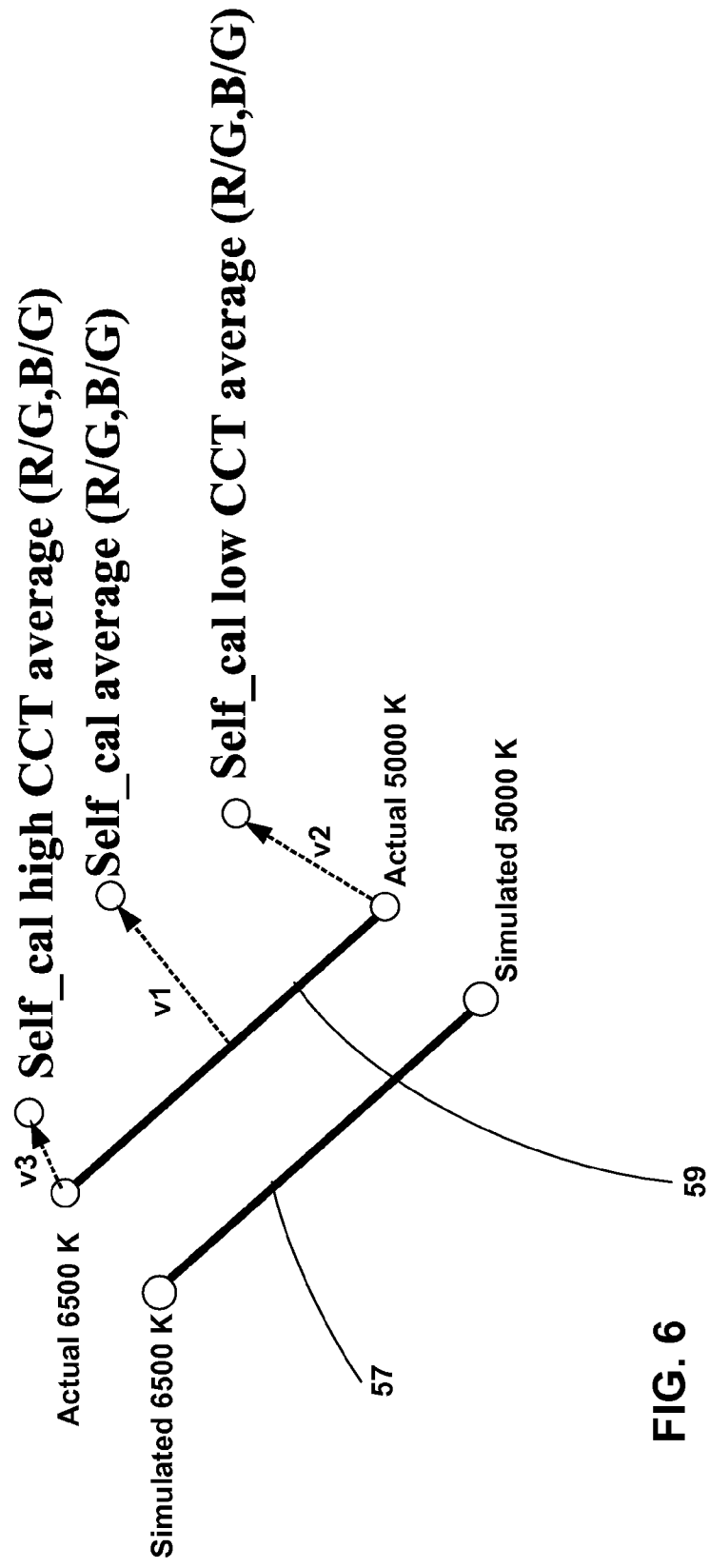
FIG. 6 is a diagram illustrating calculation of correlated color temperature (CCT) vectors relative to an actual light line.

FIG. 6 is an illustration of how calibration unit 14 may calculate CCT vectors relative to an actual light line (203). In FIG. 6, vector v1 is the overall CCT vector, vector v2 is the high CCT vector and vector v3 is the low CCT vector. As shown, v1 is defined as a vector to the overall average that is perpendicular to actual light line 59. Thus, v1 is defined from the nearest point on actual daylight line 59 to the overall average point defined by the R/G and B/G overall average points of the self_cal data structure. High CCT vector v3 is a vector from a point corresponding to actual 5000 K on actual light line 59 to the high CCT average point defined by the R/G an B/G high average points of self_cal data structure. Low CCT vector v2 is a vector from a point corresponding to actual 6500 K on actual light line 59 to the low CCT average value defined by the R/G an B/G low average points of self_cal data structure.

If there is no sensor variation between the reference camera sensor used to define actual daylight line 59, and the current camera sensor 10 being calibrated, the overall average CCT, high average CCT and low average CCT should all fall approximately on actual daylight line 59 and white point adjustments should not be needed.

Referring again to FIG. 2, after calculating the overall CCT vector v1, the high CCT vector v3 and the low CCT vector v2, calibration unit 14 calculates a combination vector (204). The combination vector comprises a weighted sum of the CCT vectors, and the weightings may be selected based on reliability and probable accuracy of the CCT vectors.

For example, the final combination vector may be defined as $$v = w1*v1 + w2*v2 + w3*v3, \text{ where } w1+w2+w3=1.0$$

The values of w1, w2 and w3 may depend on the quality of statistics. The actual weighting values selected for w1, w2 and w3 are subject to a wide variety of implementations. In one example:
  w1 is 0.4,
  w2 is 0.3 and
  w3 is 0.3.
  In another example:
  w1 is 1.0,
  w2 is 0 and
  w3 are 0, if either v2 or v3 comprise bad data.
In this case, v2 or v3 may be determined to comprise bad data if the data point for the corresponding CCT average (high or low) deviates substantially from a linear interpolation of the actual daylight line 59 defined through the overall average. Thus, good self-cal data should have all 3 data points (overall CCT average, high CCT average and low CCT average) approximately on a straight line that passes through the overall CCT average parallel to actual light line 59. If the low CCT average or high CCT average deviates too far from that straight line (e.g., as determined by a defined level or threshold for high and low average deviation), calibration unit 14 may reject the data associated with the low CCT average, the high CCT average, or both by assigning a weighting factor of zero for that corresponding vector. Again, the values of w1, w2 and w3 may depend on the quality of statistics, and the actual weighting values selected for w1, w2 and w3 are subject to a wide variety of implementations.

Figure 7:
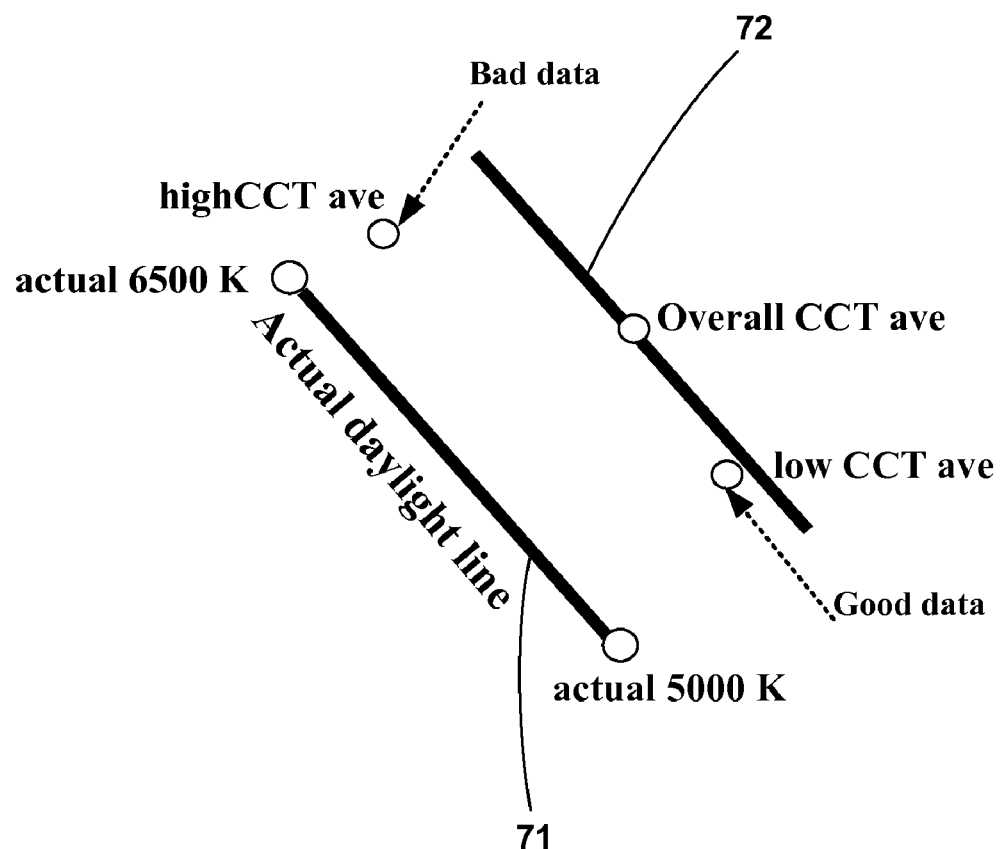
FIG. 7 is a diagram illustrating of a high CCT average, an overall CCT average, and a low CCT average relative to an actual daylight line.

FIG. 7 is an illustration of a high CCT average, an overall CCT average, and a low CCT average relative to an actual daylight line 71. Again, actual daylight line 71 originally corresponds to the daylight line defined for the reference sensor, e.g., based on simulated and actual light measurements. The line 72 parallel to actual daylight line 71 passes through the overall CCT average, and approximately through the low CCT average, but does not pass approximately through the high CCT average. In this case, the high CCT average may be flagged as bad data, and the weight factors w2 and w3 may be set to zero on this basis. In some cases, however, the weight factors w2 and w3 may depend on low CCT average and high CCT average respectively, and if one point is flagged as bad data, this may not necessarily cause the weighting factor associated with the other point to be zero. Again, the values of w1, w2 and w3 may depend on the quality of statistics, the actual weighting values selected for w1, w2 and w3 are subject to a wide variety of implementations. The exemplary weighting factors listed above are simply one implementation specific example, and a wide variety of other weighting factors could be used in accordance with this disclosure.

Referring again to FIG. 2, after calibration unit 14 calculates a combination vector, calibration unit 14 may generate gray point correction factors based on the combination vector (205). For example, a combination vector (V) in an R/B by B/G color space, may be divided into a Vx component in an R/G direction and a Vy component in a B/G direction. The gray point correction factors may be generated as:

Fx=Vx/(a simulated R/G value corresponding to approximately 5000 Kelvin)
  Fy=Vy/(a simulated B/G value corresponding to approximately 5000 Kelvin).

Fx corresponds to a correction factor in the R/G direction corresponding to D50 lighting, and Fy corresponds to a correction factor in the B/G direction corresponding to D50 lighting. D50 lighting generally corresponds to a gray point color temperature of 5000 Kelvin.

For all true gray points, e.g., from 7500 K down to 2300 K:
  a calibrated R/G value=Fx*(a given non-calibrated R/G value); and
  a calibrated B/G value=Fy*(a given non-calibrated B/G value).

Thus, calibration unit 14 can forward the generated gray point correction values of Fx an Fy to processing unit 12. Processing unit 12 then applies the gray point correction factors Fx and Fy to non-calibrated data from camera sensor 10 in order to achieve proper white balance.

At initialization, i.e., "time 0" prior to the first iteration of the calibration process:

$$Fx=Fx(\text{time } 0)=1.0 \text{ and } Fy=Fxk(\text{time } 0)=1.0.$$

Then, after the first iteration of the calibration process, i.e., "time 1" new sets of correction factors are calculated as outlined above, and referred to as Fx(time 1) and Fy(time 1). The correction factors applied at this point, are:

$$Fx=Fx(\text{time } 1)*Fx(\text{time } 0) \text{ and } Fy=Fy(\text{time } 1)*Fy(\text{time } 0).$$

Then, after the second iteration, i.e., "time 2" new sets of correction factors are calculated as outlined above, and referred to as Fx(time 2) and Fy(time 2). The correction factors applied at this point, are:

$$Fx=Fx(\text{time } 2)*Fx(\text{time } 1)*Fx(\text{time } 0) \text{ and}$$

$$Fy=Fy(\text{time } 2)*Fy(\text{time } 1)*Fy(\text{time } 0).$$

Thus, the generic representation for Fx and Fy may be given by:
  Fx=Fx(current iteration)*Product of each Fx(previous iterations) and $$Fy=Fy(\text{current iteration})*\text{Product of each } Fy(\text{previous iterations}).$$

In this way, the Fx and Fy for each iteration are accumulated products associated with the previous iterations and the current iteration. Accordingly, current gray point correction factors associated with a current iteration comprise products based on the gray point correction factors of previous iterations.

If desired, limits may be established for Fx and Fy. For example, Fx and Fy may have established upper and lower limits of 0.8 and 1.2. In this way, the calibration technique can help limit improper compensation of Fx and Fy for cases where expected environments are encountered. Limits may be established for each iteration to limit the amount of adjustments to the gray point correction factors per iteration, and possibly for the overall correction factors to limit the total amount of gray point compensation for all iterations, if desired.

Again, a wide variety of white balance algorithms can benefit from the teaching of this disclosure, which is used to calibrate the gray points. Properly calibrated gray points can improve a wide variety of imaging techniques that rely on white balance to accept or eliminate data that is not sufficiently balanced.

As explained, the described technique may be performed in an iterative fashion, with each of the iterations being defined during a subsequent use of digital camera device 2. In this way, the gray point correction factors Fx and Fy may converge to a desirable level after several iterations of the self-calibration technique. Furthermore, the techniques may cause device 2 to improve its calibration with use, i.e., the more digital camera device 2 is used, the better its calibration may be. As noted, the described techniques do not require prior knowledge of the response of camera sensor 10, which may eliminate the need to perform sensor response measurements when the digital camera devices are manufactured. The described techniques have been simulated to show desirable results for calibration, and may allow digital camera devices to use lower quality camera sensors that have higher amounts of sensor variation between different camera sensors. In this case, the described techniques may compensate for such variations as the digital camera device is used, and eventually achieve proper white balance over time.

Figure 8:
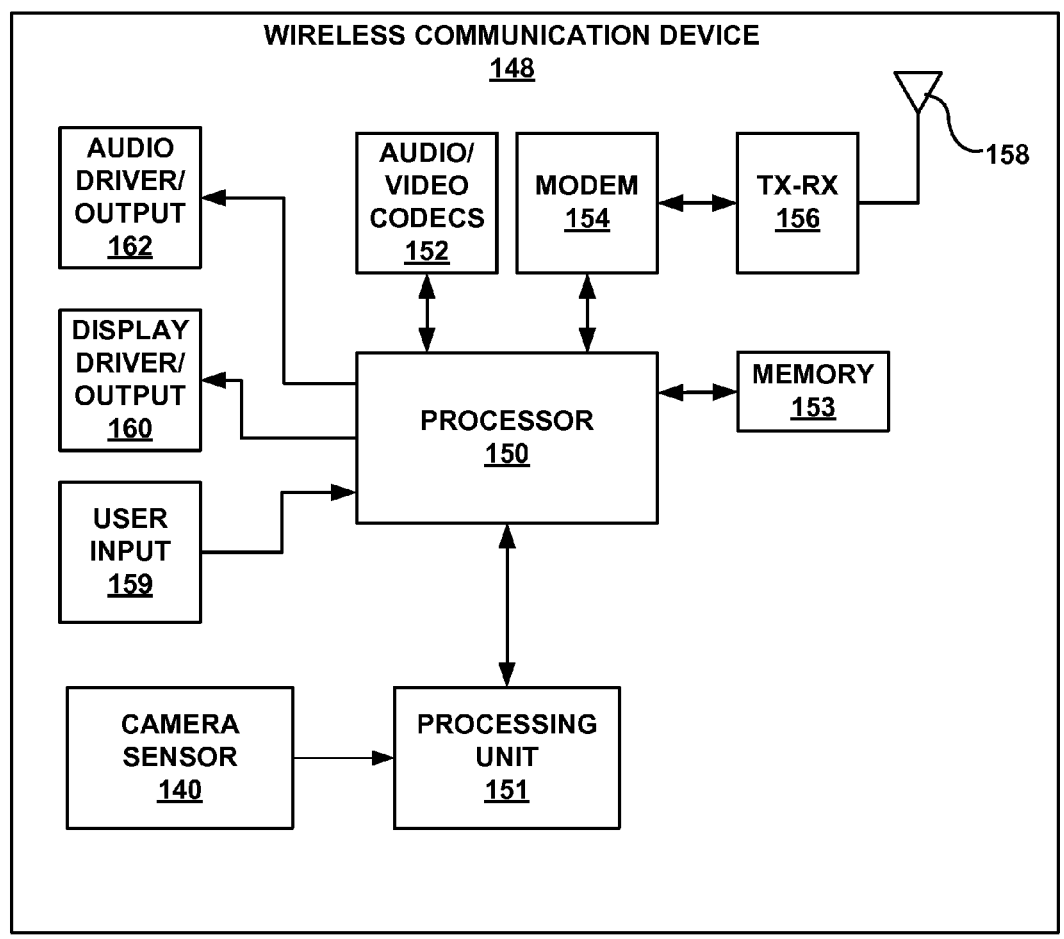
FIG. 8 is a block diagram illustrating a wireless communication device 48 capable of implementing the techniques of this disclosure.

FIG. 8 is an exemplary block diagram illustrating a wireless communication device 148 capable of implementing the techniques of this disclosure. As mentioned above, camera sensors may be provided within wireless communication devices such as a mobile radiotelephone to form a so-called camera phone or video phone. In this aspect of the disclosure, as shown in FIG. 8, wireless communication device 148 may include various components of digital camera device 2 (FIG. 1), as well as various components to support wireless communication and user interface features. For example, wireless communication device 148 may include a processor 150, audio/video encoders/decoders (CODECs) 152, a memory 153, a modem 154, a transmit-receive (TX/RX) unit 156, a radio frequency (RF) antenna 158, a user input device 159, a display driver/output device 160, an audio driver/output device 162, a camera sensor 140 and a processing unit 151. Processor 150 may be used to execute the calibration techniques described herein.

Camera sensor 140 captures information and sends the captured information to processing unit 151. Processing unit 151 may perform various image processing functions, including application of gray point correction factors Fx and Fy. Processor 150 performs the calibration techniques described herein in order to generate the correction factors Fx and Fy. In this sense, processor 150 may execute the techniques performed by calibration unit 14 of digital camera device 2 of FIG. 1.

In addition, however, processor 150 may also control a display driver and associated display output 160 and an audio driver and associated audio output 162 to present images, video and associated sounds to the user via a display and speaker associated with the wireless communication device 148. The presentation of images on display output 160 may be improved by the calibration techniques described herein. Memory 157 may store instructions for execution by processor 150 to support various operations. Although not shown in FIG. 8, memory 157 (or another memory) may be coupled to processing unit 151 or other components to store data that is processed or generated by such components. User input device 159 may include any of a variety of input media such as keys, buttons, touchscreen media or the like for the user to control operation of wireless communication device 148.

The images and audio and imagery or video may be encoded by audio/video CODECs 152 for storage and transmission. In the example of FIG. 8, audio/video CODECs may reside with the larger wireless communication device 148 to handle a variety of audio and video applications, in addition to video that may be captured by camera sensor 140. Audio-video CODECs may encode images or video according to any of a variety of encoding techniques or formats, such as MPEG-2, MPEG-4, ITU H.263, ITU H.264, JPEG, or the like.

In addition, in some aspects, wireless communication device 148 may encode and transmit such audio, images or video to other devices by wireless communication, as well as receive audio, images or video from other devices and encode it. For example, modem 154 and TX-RX unit 156 may be used to transmit encoded audio and image or video information to other wireless communication devices via 158. Modem 154 may modulate the encoded information for transmission over the air interface provided by TX-RX unit 156 and antenna 158. In addition, TX-RX unit 156 and modem 154 may process signals received via antenna 158, including encoded audio, imagery or video. TX-RX unit 156 may further include suitable mixer, filter, and amplifier circuitry to support wireless transmission and reception via antenna 158.

The calibration techniques described in this disclosure may be highly desirable for devices like wireless communication device 148, where it is desirable to limit costs associated with camera sensors. In this case, the described techniques may allow wireless communication devices, like device 48, to be manufactured with a lower quality camera sensor that have higher amounts of sensor variation between different camera sensors, and may eliminate the need to measure every camera sensor responses when the devices are manufactured. Nevertheless, the same techniques may also be applicable to a wide variety of other digital camera devices, including high quality devices for which camera sensor response measurements are performed at the time of manufacture.

The techniques described herein may be implemented in hardware, software, firmware or any combination thereof. Any of the described units, modules or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, performs one or more of the techniques described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules, hardware modules, or any combination thereof.

If implemented in hardware or a combination of hardware and software, the techniques described herein may be embodied in an apparatus, device or integrated circuit, which may comprise calibration unit 14 shown in FIG. 1, or possibly a combination of components shown in FIG. 1. An integrated circuit, for example, can be configured to perform one or more of the techniques described herein. These and other examples are within the scope of the following claims.

The invention claimed is:

1. A method for performing a calibration procedure in a digital camera device, the method comprising:
    initiating the calibration procedure when a camera sensor of the digital camera device is operating;
    accumulating data for the calibration procedure, the data comprising one or more averages of correlated color temperature (CCT) associated with information captured by the camera sensor;
    calculating one or more CCT vectors based on the one or more averages of CCT;
    generating gray point correction factors based on the one or more CCT vectors; and
    iteratively generating the gray point correction factors, wherein the gray point correction factors associated with a current iteration comprise products based on the gray point correction factors of previous iterations.

2. The method of claim 1, further comprising applying the gray point correction factors to adjust gray points in the digital camera device.

3. A method for performing a calibration procedure in a digital camera device, the method comprising:
    initiating the calibration procedure when a camera sensor of the digital camera device is operating and measured brightness associated with an image scene is greater than a brightness threshold;
    accumulating data for the calibration procedure, the data comprising one or more averages of correlated color temperature (CCT) associated with information captured by the camera sensor;
    calculating one or more CCT vectors based on the one or more averages of CCT; and
    generating gray point correction factors based on the one or more CCT vectors.

4. The method of claim 3, further comprising initiating the calibration procedure when an automatic exposure control (AEC) is determined to be steady.

5. The method of claim 4, further comprising initiating the calibration procedure in response to a high confidence outdoor determination, wherein the high confidence outdoor determination is based on lighting conditions and gains of red (R), green (G) and blue (B) channels applied to the information captured by the camera sensor.

6. A method for performing a calibration procedure in a digital camera device, the method comprising:
    initiating the calibration procedure when a camera sensor of the digital camera device is operating;
    accumulating data for the calibration procedure, the data comprising one or more averages of correlated color temperature (CCT) associated with information captured by the camera sensor;
    calculating one or more CCT vectors based on the one or more averages of CCT, wherein the one or more CCT vectors are calculated relative to an actual light line based on the one or more averages of CCT, wherein the actual light line is based on at least one pre-determined actual color temperature measurement and at least two pre-determined simulated color temperature measurements; and
    generating gray point correction factors based on the one or more CCT vectors.

7. The method of claim 6, wherein the actual light line is approximately parallel to a simulated light line defined by the at least two pre-determined simulated color temperature measurements, and wherein the at least one pre-determined actual color temperature measurement is associated with a reference camera sensor having a construction similar to the camera sensor of the digital camera device.

8. The method of claim 6, wherein the at least two pre-determined simulated color temperature measurements comprise simulated color temperature measurements at approximately 5000 Kelvin and approximately 6500 Kelvin.

9. The method of claim 6, the method further comprising:
    calculating a combination vector based on the one or more or more CCT vectors; and
    generating the gray point correction factors based on the combination vector.

10. The method of claim 9, wherein the combination vector resides in a Red/Green (R/G) by Blue/Green (B/G) color space, wherein generating gray point correction factors based on the combination vector comprises:
    dividing the combination vector (V) into a Vx component in an R/G direction and a Vy component in a B/G direction; and
    generating the gray point correction factors as:
    Fx=Vx/(a simulated R/G value corresponding to approximately 5000 Kelvin)
    Fy=Vy/(a simulated B/G value corresponding to approximately 5000 Kelvin).

11. The method of claim 10, further comprising applying the gray point correction factors, wherein applying the gray point correction factors comprises:
    calculating compensated R/G values as Fx*(a given R/G value); and
    calculating compensated B/G values as Fy*(a given B/G value).

12. The method of claim 9, wherein accumulating data for the calibration procedure comprises:
    accumulating an overall average CCT, a high average CCT and a low average CCT, wherein the overall average CCT comprises an average of all CCT samples collected by the camera sensor, wherein the high average CCT comprises an average of the CCT samples greater than the overall average CCT, and wherein the low average CCT comprises an average of the CCT samples less than the overall average CCT.

13. The method of claim 12, further comprising:
calculating an overall CCT vector, a high CCT vector and a low CCT vector relative to the actual light line based on the overall average CCT, the high average CCT and the low average CCT; and
calculating the combination vector based on the overall CCT vector, the high CCT vector and the low CCT vector.

14. The method of claim 12, further comprising:
calculating an overall CCT vector, a high CCT vector and a low CCT vector relative to the actual light line based on the overall average CCT, the high average CCT and the low average CCT;
determining whether the high CCT vector or the low CCT vector comprise bad data;
calculating the combination vector based on the overall CCT vector when the high CCT vector or the low CCT vector comprise bad data; and
calculating the combination vector based on the overall CCT vector, the high CCT vector and the low CCT vector when the high CCT vector and the low CCT vector do not comprise bad data.

15. An apparatus comprising:
memory that stores data for a calibration procedure in a digital camera device; and
a calibration unit that:
initiates the calibration procedure when a camera sensor of the digital camera device is operating;
accumulates the data for the calibration procedure, the data comprising one or more averages of correlated color temperature (CCT) associated with information captured by the camera sensor;
calculates one or more CCT vectors based on the one or more averages of CCT;
generates gray point correction factors based on the one or more CCT vectors; and
iteratively generates the gray point correction factors, wherein the gray point correction factors associated with a current iteration comprise products based on the gray point correction factors of previous iterations.

16. The apparatus of claim 15, wherein the apparatus comprises one or more integrated circuits of the digital camera device.

17. The apparatus of claim 15, further comprising a processing unit that applies the gray point correction factors to adjust gray points in the digital camera device.

18. The apparatus of claim 15, wherein the calibration unit initiates the calibration procedure when measured brightness associated with an image scene is greater than a brightness threshold.

19. The apparatus of claim 18, wherein the calibration unit initiates the calibration procedure when an automatic exposure control (AEC) is determined to be steady.

20. The apparatus of claim 19, wherein the calibration unit initiates the calibration procedure in response to a high confidence outdoor determination, wherein the high confidence outdoor determination is based on lighting conditions and gains of red (R), green (G) and blue (B) channels applied by a processing unit to the information captured by the camera sensor.

21. The apparatus of claim 15, wherein the calibration unit calculates the one or more CCT vectors relative to an actual light line based on the one or more averages of CCT, wherein the actual light line is based on at least one pre-determined actual color temperature measurement and at least two pre-determined simulated color temperature measurements.

22. The apparatus of claim 21, wherein the actual light line is approximately parallel to a simulated light line defined by the at least two pre-determined simulated color temperature measurements, and wherein the at least one pre-determined actual color temperature measurement is associated with a reference camera sensor having a construction similar to the camera sensor of the digital camera device.

23. The apparatus of claim 21, wherein the at least two pre-determined simulated color temperature measurements comprise simulated color temperature measurements at approximately 5000 Kelvin and approximately 6500 Kelvin.

24. The apparatus of claim 21, wherein the calibration unit:
calculates a combination vector based on the one or more or more CCT vectors; and
generates the gray point correction factors based on the combination vector.

25. The apparatus of claim 24, wherein the combination vector resides in a Red/Green (R/G) by Blue/Green (B/G) color space, wherein the calibration unit:
divides the combination vector (V) into a Vx component in an R/G direction and a Vy component in a B/G direction; and
generates the gray point correction factors as:
Fx=Vx/(a simulated R/G value corresponding to approximately 5000 Kelvin)
Fy=Vy/(a simulated B/G value corresponding to approximately 5000 Kelvin).

26. The apparatus of claim 25, further comprising a processing unit that applies the correction factors, wherein the processing unit:
calculates compensated R/G values as Fx*(a given R/G value); and
calculates compensated B/G values as Fy*(a given B/G value).

27. The apparatus of claim 24, wherein the calibration unit:
accumulates an overall average CCT, a high average CCT and a low average CCT, wherein the overall average CCT comprises an average of all CCT samples collected by the camera sensor, wherein the high average CCT comprises an average of the CCT samples greater than the overall average CCT, and wherein the low average CCT comprises an average of the CCT samples less than the overall average CCT.

28. The apparatus of claim 27, wherein the calibration unit:
calculates an overall CCT vector, a high CCT vector and a low CCT vector relative to the actual light line based on the overall average CCT, the high average CCT and the low average CCT; and
calculates the combination vector based on the overall CCT vector, the high CCT vector and the low CCT vector.

29. The apparatus of claim 27, wherein the calibration unit:
calculates an overall CCT vector, a high CCT vector and a low CCT vector relative to the actual light line based on the overall average CCT, the high average CCT and the low average CCT;
determines whether the high CCT vector or the low CCT vector comprise bad data;
calculates the combination vector based on the overall CCT vector when the high CCT vector or the low CCT vector comprise bad data; and
calculates the combination vector based on the overall CCT vector, the high CCT vector and the low CCT vector when the high CCT vector and the low CCT vector do not comprise bad data.

30. A non-transitory computer-readable medium comprising instructions that upon execution cause a processor to perform a calibration procedure in a digital camera device, wherein the instructions cause the processor to:
  initiate the calibration procedure when a camera sensor of the digital camera device is operating;
  accumulate data for the calibration procedure, the data comprising one or more averages of correlated color temperature (CCT) associated with information captured by the camera sensor;
  calculate one or more CCT vectors based on the one or more averages of CCT;
  generate gray point correction factors based on the one or more or more CCT vectors; and
  iteratively generate the gray point correction factors, wherein the gray point correction factors associated with a current iteration comprise products based on the gray point correction factors of previous iterations.

31. The non-transitory computer-readable medium of claim 30, wherein the instructions cause the processor to apply the gray point correction factors to adjust gray points in the digital camera device.

32. The non-transitory computer-readable medium of claim 30, wherein the instructions cause the processor to initiate the calibration procedure when measured brightness associated with an image scene is greater than a brightness threshold.

33. The non-transitory computer-readable medium of claim 32, wherein the instructions cause the processor to initiate the calibration procedure when an automatic exposure control (AEC) is determined to be steady.

34. The non-transitory computer-readable medium of claim 33, wherein the instructions cause the processor to initiate the calibration procedure in response to a high confidence outdoor determination, wherein the high confidence outdoor determination is based on lighting conditions and gains of red (R), green (G) and blue (B) channels applied to the information captured by the camera sensor.

35. The non-transitory computer-readable medium of claim 33, wherein the instructions cause the processor to calculate one or more CCT vectors relative to an actual light line based on the one or more averages of CCT, wherein the actual light line is based on at least one pre-determined actual color temperature measurement and at least two pre-determined simulated color temperature measurements.

36. The non-transitory computer-readable medium of claim 35, wherein the actual light line is approximately parallel to a simulated light line defined by the at least two pre-determined simulated color temperature measurements, and wherein the at least one pre-determined actual color temperature measurement is associated with a reference camera sensor having a construction similar to the camera sensor of the digital camera device.

37. The non-transitory computer-readable medium of claim 35, wherein the at least two pre-determined simulated color temperature measurements comprise simulated color temperature measurements at approximately 5000 Kelvin and approximately 6500 Kelvin.

38. The non-transitory computer-readable medium of claim 35, wherein the instructions cause the processor to:
  calculate a combination vector based on the one or more or more CCT vectors; and
  generate the gray point correction factors based on the combination vector.

39. The non-transitory computer-readable medium of claim 38, wherein the combination vector resides in a Red/Green (R/G) by Blue/Green (B/G) color space, wherein the instructions cause the processor to:
  divide the combination vector (V) into a Vx component in an R/G direction and a Vy component in a B/G direction; and
  generate the gray point correction factors as:
  $Fx=Vx/$(a simulated R/G value corresponding to approximately 5000 Kelvin)
  $Fy=Vy/$(a simulated B/G value corresponding to approximately 5000 Kelvin).

40. The non-transitory computer-readable medium of claim 39, wherein the instructions cause the processor to:
  calculate compensated R/G values as $Fx*$(a given R/G value); and
  calculate compensated B/G values as $Fy*$(a given B/G value).

41. The non-transitory computer-readable medium of claim 38, wherein the instructions cause the processor to:
  accumulate an overall average CCT, a high average CCT and a low average CCT, wherein the overall average CCT comprises an average of all CCT samples collected by the camera sensor, wherein the high average CCT comprises an average of the CCT samples greater than the overall average CCT, and wherein the low average CCT comprises an average of the CCT samples less than the overall average CCT.

42. The non-transitory computer-readable medium of claim 41, wherein the instructions cause the processor to:
  calculate an overall CCT vector, a high CCT vector and a low CCT vector relative to the actual light line based on the overall average CCT, the high average CCT and the low average CCT; and
  calculate the combination vector based on the overall CCT vector, the high CCT vector and the low CCT vector.

43. The non-transitory computer-readable medium of claim 41, wherein the instructions cause the processor to:
  calculate an overall CCT vector, a high CCT vector and a low CCT vector relative to the actual light line based on the overall average CCT, the high average CCT and the low average CCT;
  determine whether the high CCT vector or the low CCT vector comprise bad data;
  calculate the combination vector based on the overall CCT vector when the high CCT vector or the low CCT vector comprise bad data; and
  calculate the combination vector based on the overall CCT vector, the high CCT vector and the low CCT vector when the high CCT vector and the low CCT vector do not comprise bad data.

44. A device comprising:
  means for initiating a calibration procedure when a camera sensor of a digital camera device is operating and a measured brightness associated with an image scene is greater than a brightness threshold;
  means for accumulating data for the calibration procedure, the data comprising one or more averages of correlated color temperature (CCT) associated with information captured by the camera sensor;
  means for calculating one or more CCT vectors based on the one or more averages of CCT; and
  means for generating gray point correction factors based on the one or more or more CCT vectors the combination vectors.

45. The device of claim 44, further comprising means for applying the gray point correction factors to adjust gray points in the digital camera device.

46. The device of claim 44, wherein means for generating the gray point correction factors:
iteratively generates the gray point correction factors, wherein the gray point correction factors associated with a current iteration comprise products based on the gray point correction factors of previous iterations.

47. The device of claim 44, wherein means for initiating initiates the calibration procedure when an automatic exposure control (AEC) is determined to be steady.

48. The device of claim 44, wherein means for initiating initiates the calibration procedure in response to a high confidence outdoor determination, wherein the high confidence outdoor determination is based on lighting conditions and gains of red (R), green (G) and blue (B) channels applied to the information captured by the camera sensor.

49. The device of claim 44, wherein means for calculating calculates the one or more CCT vectors relative to an actual light line based on the one or more averages of CCT, wherein the actual light line is based on at least one pre-determined actual color temperature measurement and at least two pre-determined simulated color temperature measurements.

50. The device of claim 49, wherein the actual light line is approximately parallel to a simulated light line defined by the at least two pre-determined simulated color temperature measurements, and wherein the at least one pre-determined actual color temperature measurement is associated with a reference camera sensor having a construction similar to the camera sensor of the digital camera device.

51. The device of claim 49, wherein the at least two pre-determined simulated color temperature measurements comprise simulated color temperature measurements at approximately 5000 Kelvin and approximately 6500 Kelvin.

52. The device of claim 49, further comprising means for calculating a combination vector based on the one or more or more CCT vectors, wherein: the means for generating generates the gray point correction factors based on the combination vector.

53. The device of claim 52, wherein the combination vector resides in a Red/Green (R/G) by Blue/Green (B/G) color space, wherein means generating:
divides the combination vector (V) into a Vx component in an R/G direction and a Vy component in a B/G direction, and
generates the gray point correction factors as:
Fx=Vx/(a simulated R/G value corresponding to approximately 5000 Kelvin)
Fy=Vy/(a simulated B/G value corresponding to approximately 5000 Kelvin).

54. The device of claim 53, further comprising means for applying the gray point correction factors, wherein means for applying comprises:
means for calculating compensated R/G values as Fx*(a given R/G value); and
means for calculating compensated B/G values as Fy*(a given B/G value).

55. The device of claim 52, wherein means for accumulating data for the calibration procedure comprises:
means for accumulating an overall average CCT, a high average CCT and a low average CCT, wherein the overall average CCT comprises an average of all CCT samples collected by the camera sensor, wherein the high average CCT comprises an average of the CCT samples greater than the overall average CCT, and wherein the low average CCT comprises an average of the CCT samples less than the overall average CCT.

56. The device of claim 55, wherein:
means for calculating one or more CCT vectors comprises means for calculating an overall CCT vector, a high CCT vector and a low CCT vector relative to the actual light line based on the overall average CCT, the high average CCT and the low average CCT; and
means for calculating the combination vector calculates the combination vector based on the overall CCT vector, the high CCT vector and the low CCT vector.

57. The device of claim 55:
wherein means for calculating one or more CCT vectors comprises means for calculating an overall CCT vector, a high CCT vector and a low CCT vector relative to the actual light line based on the overall average CCT, the high average CCT and the low average CCT;
the device further comprising means for determining whether the high CCT vector or the low CCT vector comprise bad data;
wherein means for calculating the combination vector calculates the combination vector based on the overall CCT vector when the high CCT vector or the low CCT vector comprise bad data; and
wherein means for calculating the combination vector calculates the combination vector based on the overall CCT vector, the high CCT vector and the low CCT vector when the high CCT vector and the low CCT vector do not comprise bad data.

58. A digital camera device comprising:
a camera sensor that captures information;
memory that stores data for a calibration procedure based on the captured information; and
a calibration unit that:
initiates the calibration procedure when the camera sensor is operating;
accumulates the data for the calibration procedure, the data comprising one or more averages of correlated color temperature (CCT) associated with the information captured by the camera sensor;
calculates one or more CCT vectors based on the one or more averages of CCT, wherein the one or more CCT vectors are calculated relative to an actual light line based on the one or more averages of CCT, wherein the actual light line is based on at least one pre-determined actual color temperature measurement and at least two pre-determined simulated color temperature measurements; and
generates gray point correction factors based on the one or more or more CCT vectors.

59. The digital camera device of claim 58, further comprising a processing unit that applies the gray point correction factors to adjust gray points in the digital camera device.

60. The digital camera device of claim 58, wherein the digital camera device comprises a camera-equipped wireless communication device handset.

* * * * *